United States Patent [19]

Rahn

[11] Patent Number: 5,172,876
[45] Date of Patent: Dec. 22, 1992

[54] SPIN REORIENTATION MANEUVER FOR SPINNING SPACECRAFT

[75] Inventor: Christopher D. Rahn, Pleasant Hill, Calif.

[73] Assignee: Space Systems/Loral, Inc., Newport Beach, Calif.

[21] Appl. No.: 563,161

[22] Filed: Aug. 3, 1990

[51] Int. Cl.$^5$ ............................................. B64G 1/24
[52] U.S. Cl. .................................... 244/164; 244/169; 244/171
[58] Field of Search ............... 244/164, 165, 169, 171, 244/3.2, 3.21, 3.23

[56] References Cited

U.S. PATENT DOCUMENTS

| | | | |
|---|---|---|---|
| 3,591,108 | 7/1971 | Perkel et al. | |
| 3,940,096 | 2/1976 | Keigler et al. | 244/165 |
| 4,071,211 | 1/1978 | Muhlfelder et al. | 244/165 |
| 4,193,570 | 3/1980 | Hoffman et al. | 244/165 |
| 4,275,861 | 6/1981 | Hubert | 244/165 |
| 4,288,051 | 9/1981 | Goschel | 244/164 |
| 4,306,692 | 12/1981 | Kaplan et al. | 244/165 |
| 4,386,750 | 6/1983 | Hoffman | 244/169 |
| 4,424,948 | 1/1984 | Muhlfelder et al. | 244/165 |
| 4,504,032 | 3/1985 | Phillips et al. | 244/170 |
| 4,630,790 | 12/1986 | Williams, Jr. | 244/164 X |
| 4,657,210 | 4/1987 | Hubert et al. | 244/158 R |
| 4,728,062 | 3/1988 | Hubert | 244/170 |
| 4,958,788 | 9/1990 | Namera et al. | 244/169 |

FOREIGN PATENT DOCUMENTS 0090914 10/1983 European Pat. Off. ............ 244/164

OTHER PUBLICATIONS

Hubert, C., "Spacecraft Attitude Acquisition from an Arbitrary Spinning or Tumbling State," *J. Guidance and Control*, vol. 4, No. 2, pp. 164-170 (Mar.-Apr., 1981).

Likins, P. W., "Effects of Energy Dissipation on the Free Body Motions of Spacecraft," NASA TR#32-860 (1966).

Thomson, W. T., *Introduction to Space Dynamics*, John Wiley & Sons, Inc., New York, pp. 220-227 (1961).

Leliakov, I. P. and Barba, P. M., "Damping Spacecraft Nutation by Means of a Despun Antenna," AAS/AIAA Astrodynamics Conference, AAS73-205 (1973).

Junkins, J. L. and Turner, J. D., *Optimal Spacecraft Rotational Maneuvers*, Elsevier, N.Y., pp. 250 and 287-308 (1986).

Weissberg, J. and Ninomiya, K., "Improved Method for the Initial Attitude Acquisition Maneuver," *Journal of Guidance and Control*, vol. 10, No. 3, pp. 316-319 (May-Jun. 1987).

Hughes, P. C., *Spacecraft Attitude Dynamics*, John Wiley & Sons, New York, pp. 104-108 (1986).

Harrison, J. A., Garg, S. C., and Furumoto, N., "A Free-Fall Technique to Measure Nutation Divergence, and Applications," AAS/AIAA 83-372 (1983).

Rahn, C., and Barba, P., "Reorientation Maneuver for Spinning Spacecraft," AAS/AIAA Astrodynamics Specialist Conference, Paper AAS 89-392, AAS Publications Office, Aug. 7-10, 1989.

*Primary Examiner*—Charles A. Marmor
*Assistant Examiner*—Carla Mattix
*Attorney, Agent, or Firm*—Townsend and Townsend

[57] ABSTRACT

A method for controlling reorientation of a spacecraft's spin from a minor axis spin bias to a desired major axis spin after spin transition. A control system monitors rotational rates about the principal axes to detect a separatrix crossing of a polhode path therein. Controlled thruster firings resulting from spin rate information successively decrease and increase a characteristic parameter and capture the spacecraft during a spin transition to a desired major axis bias orientation. It is possible to monitor only $\omega_1$ and $\omega_3$ in an alternate embodiment.

19 Claims, 4 Drawing Sheets

SPIN REORIENTATION MANEUVER FOR SPINNING SPACECRAFT

BACKGROUND OF THE INVENTION

The present invention relates generally to methods for controlling spin reorientation of spinning spacecraft. More specifically, the present invention relates to affecting a spin transition of a spacecraft from a minor axis spin to a particular major axis spin orientation.

A single-body spacecraft having energy dissipation and which spins about a minor axis is directionally unstable. Active control, such as rocket motors or dampers on despun platforms, stabilize such a spacecraft. Removal of these stabilizing mechanisms permit the spacecraft to reorient its principal spin axis and begin to rotate about its major axis. The reorientation results from energy dissipation, including fuel slosh and vibration. Spin transition is the term coined for this reorientation maneuver from a spin bias about a minor spin axis to a spin bias about a major spin axis.

FIG. 1 is a graphical representation of a spacecraft 10 with a major axis X, an intermediate axis Y, and a minor axis Z. The major axis X coincides with a principal moment of inertia axis having the largest inertia, $I_1$. The minor axis Z is orthogonal to the major axis X and coincides with a principal moment of inertia axis having the smallest inertia, $I_3$. The intermediate axis Y is orthogonal to both the major axis X and the minor axis Z and coincides with a principal moment of inertia having an intermediate inertia, $I_2$. For virtually all real world spacecraft, $I_1 > I_2 > I_3$.

Spin rates, either positive or negative, about the X axis, Y axis, or the Z axis are, respectively, $\omega_1$, $\omega_2$, and $\omega_3$. Spacecraft often are purposefully and initially rotated about the minor axis Z for several reasons. First, launch vehicles have fairings which constrain or require that a long and narrow axis of the spacecraft, that is, the Z axis, be aligned with the longitudinal axis of the launch vehicle. The launch vehicle typically spins longitudinally prior to separation and results in a minor axis spin rate for the spacecraft 10 after separation. Second, when a rocket motor is used for orbit raising, the rocket motor and spacecraft combination is spun about the minor axis to increase stability during the firing and orbit raising. When the firing is completed, the combination undergoes spin transition.

Spin transition has some problems. One problem is that orientation of the spacecraft relative to an inertially-fixed angular momentum vector at the completion of the spin transition maneuver cannot be determined in advance with any degree of accuracy. In other words, the spacecraft 10 has either a positive or a negative spin about the major axis X. Physically, this corresponds to two final attitudes which are 180° apart. Either face A or face B (of FIG. 1) will present itself in the desired direction. Many spacecraft 10 have sensitive on-board instruments which must be shielded from the sun or have directional communication equipment which must point towards the earth. In both of these situations, ensuring a final spin polarity about the major axis is necessary.

Prior art techniques of optimal reorientation for a spacecraft 10 for attitude acquisition using momentum wheels have been developed. In terms of fuel usage, the passive sign transition maneuver is optimal, and momentum wheels, with their attendant complexity, are not required. To make the maneuver truly useful, however, the final spin polarity must be controlled, requiring some fuel expenditure. Conventional methods attempt to control the spacecraft during spin transition to prevent occurrence of an improper orientation.

SUMMARY OF THE INVENTION

The present invention provides a method for effecting spin transition of a rotating object from a spin about a minor axis to a particular spin about a major axis by permitting passive spin transition and afterward determining if the final orientation will be correct while asserting active control only upon an indication of an incorrect orientation.

In a specific embodiment, a detected sign change in $\omega_3$ establishes an occurrence of a spin transition. Testing $\omega_1$ determines if the spacecraft has the desired sign for the major axis. Subsequently, if $\omega_1$ has the wrong sign (indicating an incorrect final orientation) a control system waits until $\omega_2$ changes sign before firing a thruster and thereafter waits for $\omega_1$ to change sign, followed by a sign change for $\omega_2$. These sign changes, in this order, initiates a second thruster firing in the opposite direction. The second thruster firing captures the spacecraft 10 into a desired spin orientation about the major axis. The invention simply and efficiently, with a minimum of fuel use, permits control of a final orientation of the stable major axis spin of a spacecraft.

According to one aspect of the invention, the method includes the steps of detecting a spin transition and determining if the passively obtained final result has the desired orientation. The desired orientation requires no further action. However, 50% of the time the final orientation will be incorrect, requiring that the spacecraft be respun about the minor axis and wait for another spin transition to determine if the new final result has the desired orientation. Without control, it will have the desired orientation 50% of the time.

The method according to a preferred embodiment controls the subsequent spin transition to guarantee the final desired result. To accurately control the respinning and subsequent spin transition, a characteristic parameter is first decreased upon an intermediate axis spin-rate sign change. Thereafter, a sign change for $\omega_1$, followed by a sign change for $\omega_2$, initiates an equal and opposite thruster firing which increases the characteristic parameter and captures the major axis spin in its desired orientation.

The invention simply and efficiently controls spin reorientation for spinning spacecraft by complete passive control half of the time. The other half of the time, the invention minimizes fuel usage to control a final orientation of the spacecraft.

Referring to the remaining portions of the specification and drawings provides a further understanding of the nature and advantages of the present invention.

BRIEF DESCRIPTION OF THE DRAWINGS

FIG. 3A is a time response of a minor axis spin rate;

FIG. 3B is a time response of an intermediate axis spin rate;

FIG. 3C is a time response of a major axis spin rate;

FIG. 3D is a time response of angular momentum;

FIG. 3E is a time response of spacecraft kinetic energy; and

FIG. 3F is a time response of the characteristic parameter;

FIG. 6A illustrates controlled minor axis spin rate time response;

FIG. 6B shows controlled time response for intermediate axis spin rates;

FIG. 6C illustrates major axis spin rate controlled time response;

FIG. 6D illustrates angular momentum in a controlled polarity implementation;

FIG. 6E illustrates kinetic energy of the spacecraft time response for spin transition with control;

FIG. 6F is a controlled time response for the characteristic parameter of a spacecraft implementing spin transition control.

DESCRIPTION OF THE SPECIFIC EMBODIMENTS

Additional discussion of the present invention may be found in a paper "Reorientation Maneuver for Spinning Spacecraft," presented during a AAS/AIAA Astrodynamics Specialist Conference in Stowe, Vt., Aug. 7-10, 1989. The paper may be obtained from the AAS Publications Office, P.O. Box 28130, San Diego, Calif. 92128, and is hereby expressly incorporated by reference herein for all purposes. As developed in the paper, the spacecraft 10 is modelled as a rigid body with an energy sink. An angular momentum, h, and a rotational energy, T, of the rigid body is expressed:

$$h^2 = I_1^2 \omega_1^2 + I_2^2 \omega_2^2 + I_3^2 \omega_3^2 \quad (1)$$

$$2T = I_1 \omega_1^2 + I_2 \omega_2^2 + I_3 \omega_3^2 \quad (2)$$

A polhode for the rigid body traces an angular velocity vector path in terms of body axis coordinates. An intersection of the momentum ellipsoid (Equation 1) and the energy ellipsoid (Equation 2), identifies the polhode for the rigid body. Absent any energy dissipation for the spacecraft, h and T are constant, and the polhode is a closed path corresponding to nutational motion of the spacecraft.

Figure 1:
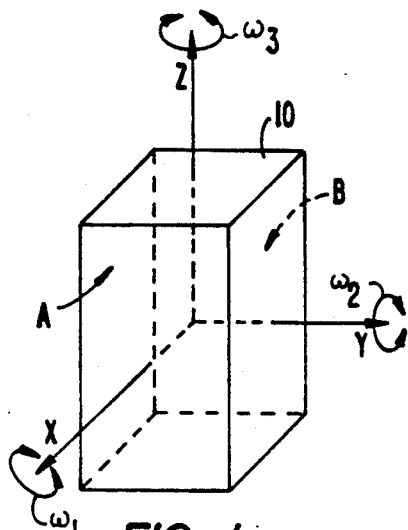
FIG. 1 is a graphical representation of a spacecraft with major, intermediate and minor axes X, Y and Z, respectively.
Figure 2:
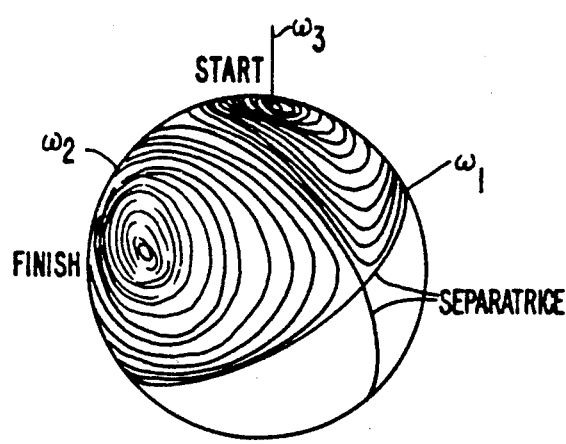
FIG. 2 is a polhode for a typical spin transition from rotation about a minor axis to rotation about a major axis.

For energy dissipation, T decreases and the energy ellipsoid shrinks with time. FIG. 2 illustrates an open polhode path spiraling outward from a minor axis Z, identified by its spin rate $\omega_3$, and capturing on a major axis X, identified by $\omega_1$. The polhode switches from rotation about the minor axis to rotation about the major axis somewhere along the spiral path. The point on which this transition occurs corresponds to a crossing of a separatrix.

An exact point on which the polhode crosses the separatrix is dependent on the initial conditions and energy dissipation characteristics of the spacecraft. Small changes in either of these parameters change the side in which the polhode crosses the separatrix, which changes the final spin polarity. There is a 50% chance of capturing the spin for either direction of $\omega_1$ spin. It is impossible to predict with any degree of accuracy the final $\omega_1$. An example used in the following instances and figures results from simulated initial conditions as follows:

| | |
|---|---|
| Principal moment of inertia about the X axis | 2000 kg · m² |
| Principal moment of inertia about the Y axis | 1500 kg · m² |
| Principal moment of inertia about the Z axis | 1000 kg · m² |
| Initial Major Axis (X) Spin Rate ($\omega_1$) | .1224 rad/s |
| Initial Intermediate (Y) Axis Rate ($\omega_2$) | .0 rad/s |
| Initial Minor Axis (Z) Rate ($\omega_3$) | 2.99 rad/s |

Control Logic

The control logic of the preferred embodiment guarantees desired final spin polarity. Initially, the spacecraft 10 spins about its minor axis with some small amount of nutation ($\omega_1$ and/or $\omega_2$ and $\omega_3$ non-zero). The spacecraft begins to transition into a flat spin, that is a spin about the major axis. When the polhode crosses the separatrix, the control logic determines the spin direction. If the spin direction for the major axis is correct, no action is taken. If the spin direction is incorrect, a spacecraft thruster fires to force the polhode to recross the separatrix. Then, a short time later, an opposite thruster fires, causing the polhode to cross the separatrix again; this time the polhode is on the desired side of the ellipsoid to provide the final desired spin polarity.

The polhode first crosses the separatrix when $\omega_3 = 0$. One method to detect the polhode crossing the separatrix is to provide sensors which are sensitive enough to detect $\omega_3 = 0$. Alternatively, most missions use relatively inexpensive rate gyros. Any rate gyro can be used to determine $\omega_3 = 0$. In the preferred embodiment, existing rate gyro sensors on-board the spacecraft used for stationkeeping serve an additional purpose for spin polarity control. Unfortunately, the on-orbit rate gyros have limited range and saturate within a limited range. These on-orbit rate gyros cannot accurately measure the relatively high rotational rates which occur during spin transition. However, these on-orbit rate gyros are useful for determining a sign of the principal axes spin rates and hence a sign change indicates when $\omega_3 = 0$. An alternate embodiment addresses use of gyros which are not precisely aligned with the spacecraft axes. In these situations, some non-zero, but measurable rate, may indicate a separatrix crossing. The rate passing through this measurable rate in the gyro's non-saturation region may indicate a separatrix crossing.

Figure 3A:
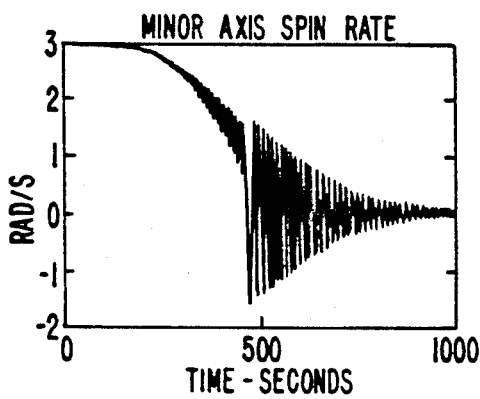
FIG. 3A–FIG. 3F illustrate time response of spacecraft rates, angular momentum, kinetic energy, and characteristic parameter during spin transition; specifically.
Figure 3B:
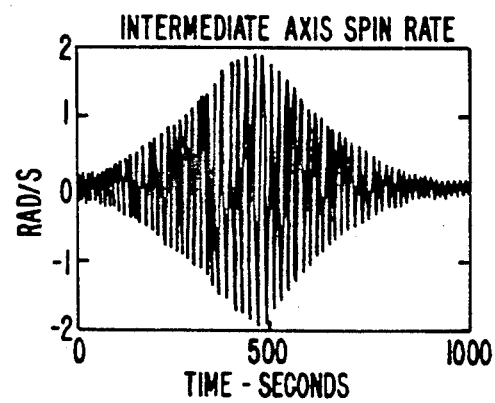
Figure 3C:
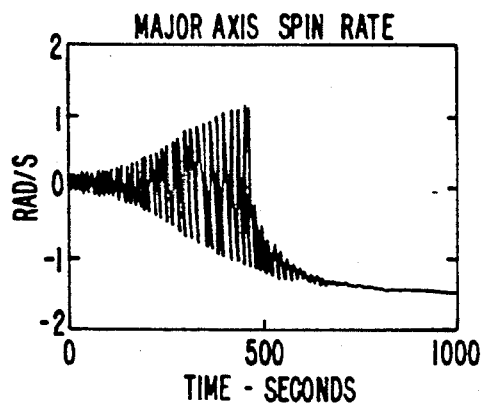
Figure 3D:
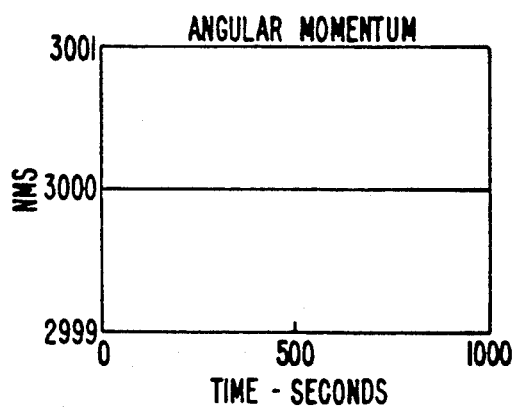
Figure 3E:
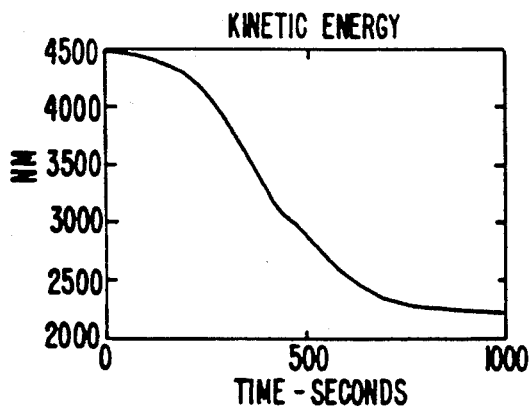
Figure 3F:
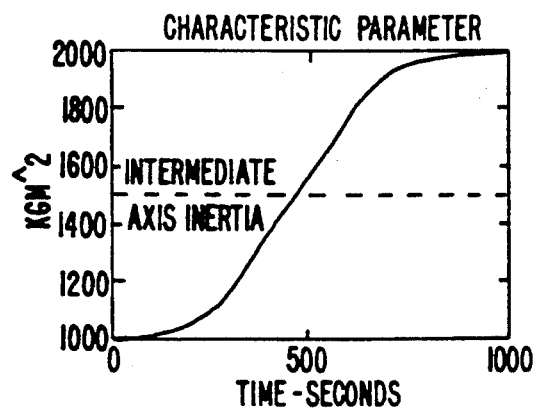

Predicting polhode crossing of the separatrix is difficult, and small changes in various dynamics of the system can alter final major axis spin rates. However, it is relatively easy to determine that a separatrix crossing has occurred. FIGS. 3A through FIG. 3F illustrate a time response of spacecraft rates for spin transition as well as angular momentum, kinetic energy, and a characteristic parameter. FIG. 3A illustrates the time response of a minor axis spin rate. Initially, the spacecraft 10 spins about its minor axis and transitions to a spin about its major axis. When the minor spin rate changes sign, the polhode has crossed the separatrix. In all cases, the polhode crosses the separatrix before the minor axis spin rate changes. Therefore, the minor axis rate sign change is a conservative indicator of the separatrix crossing. FIG. 3A illustrates an initial minor axis spin rate, $\omega_3$, of approximately 3 rad/s which, after about 500 seconds, changes sign to indicate a separatrix crossing. Thereafter, the minor axis spin rate will periodically change sign, and the minor axis spin rate will decay to approximately zero as the spacecraft transitions to a particular bias for its major axis spin rate. FIG. 3B illustrates intermediate axis spin rate, $\omega_2$, during spin transition. Initially, $\omega_2=0$ and increases to a maximum at the separatrix crossing of $\omega_3$. Spin rate $\omega_2$ decays to zero after the spin transition into the final stable major axis spin bias. Note that at the transition of the polhode crossing the separatrix, a frequency of $\omega_2$ is lowest. Thus, the frequency of $\omega_2$ provides an alternate separatrix crossing indicator. FIG. 3C illustrates the time response of the major axis spin rate ($\omega_1$) from transition from a minor axis spin to a stable major axis spin. Initially, the major axis spin rate periodically changes sign and its rate increases until the separatrix crosses the polhode ($\approx 500$ seconds). After the crossing, a particular bias of the major axis spin rate, $\omega_1$, develops. FIG. 3C illustrates $\omega_1 \approx -1\frac{1}{2}$ rad/s. As illustrated in FIG. 3D, the angular momentum, h, remains constant during the maneuver. FIG. 3E illustrates the kinetic energy, T, decreasing with time. FIG. 3F illustrates the change of a characteristic parameter during spin transition.

Once the polhode has crossed the separatrix, it is possible to determine the major axis spin rate bias. In the preferred embodiment, the sign of the major axis spin rate is established from a gyro measuring $\omega_1$. If the sign of the major axis spin rate corresponds to a desired spacecraft orientation, the maneuver is complete, and transition has been successfully accomplished to its desired position. If the sign is of opposite polarity, however, the spacecraft must be reoriented.

Thruster firing readily accomplishes reorientation of the spacecraft. The thruster firing removes the major axis spin bias. Thereafter, the control logic may allow another uncontrolled spin transition or control the subsequent spin transition. Uncontrolled spin transitions require subsequent checking and respins until $\omega_1$ is correct. The preferred embodiment fires a second thruster to capture and guarantee the final orientation of the major axis.

Spin polarity after a polhode crossing of a separatrix determines whether thrusters are fired. If the spin polarity is correct, no thrusters are fired. If the spin polarity is incorrect, two thruster firings change the spin polarity and capture the polhode for a correct orientation of the major axis spin rate. The objective of the thruster firings is to control the polhode separatrix crossing and result in a desired direction for a major axis spin rate. Thruster firings affect a "characteristic parameter," I, that measures a distance "between the polhode and the separatrix." The characteristic parameter, I, is written:

$$I = \frac{h^2}{2T} \quad (I_3 < I < I_1) \qquad (3)$$

As an energy of the spacecraft or the spinning body decreases, the characteristic parameter, I, increases as shown in FIG. 3F. At the separatrix crossing, I equals the principle momentum of inertia about the intermediate axis, $I_2$. FIG. 3F shows that the characteristic parameter equals the intermediate axis inertia at the separatrix crossing. The characteristic parameter, I, qualitatively divides motion of the spacecraft into a regime of primarily minor axis spin (characteristic parameter is less than $I_2$ (the principle moment of inertia about the intermediate axis), and a regime of primarily major axis spin (characteristic parameter I is greater than $I_2$).

An equivalent gain of a thruster firing is defined as K and is written:

$$I^+ = KI \qquad (4)$$

where $I^+$ is the characteristic after the firing. If $I > I_2$, and the objective of the firing is to cross the separatrix, then K is chosen less than 1 such that $I^+ < I_2$. For a separatrix crossing in the opposite direction, K is chosen greater than 1.

The equivalent gain is calculated from thruster impulses, $i_1$, $i_2$, and $i_3$. Assuming the thruster firings are impulsive, $$K = \frac{h^2 + 2(h_1 i_1 + h_2 i_2 + h_3 i_3) + i_1^2 + i_2^2 + i_3^2}{h^2 + 2\left(\frac{I_2}{I_1} h_1 i_1 + h_2 i_2 + \frac{I_2}{I_3} h_3 i_3\right) + \frac{I_2}{I_1} i_1^2 + i_2^2 + \frac{I_2}{I_3} i_3^2} \qquad (5)$$

where $h_1$, $h_2$ and $h_3$ are the components of the angular momentum prior to the firing.

For a given thruster gain value K, the timing and direction of thruster impulse must be determined. Since rate gyros provide only rate information, thrusters must be timed according to when the sign of a rate changes, indicating measurement of a zero rate. Combined with three possible impulse directions, there are nine combinations of impulse directions and firing times. For most practical cases, an impulse about the minor axis which is fired when $\omega_2 = 0$ uses the least propellant for a given value K. The size of the impulse is calculated by substituting $\omega_2 = 0$, $i_1 = 0$, and $i_2 = 0$ into Equation 5 and solving for $i_3$:

$$i_3 = -h_3 + \text{sign}(h_3) \sqrt{h_3^2 - \frac{I_3 h^2 (1 - K)}{I_3 - K I_2}} \qquad (6)$$

The polhode is near the separatrix when each impulse is fired; therefore small angle approximations may be used.

$$\omega_2 \approx s_2 \omega_{2m} \tanh\tau \text{ and } \omega_3 \approx s_3 \omega_{3m} \text{sech}\tau \qquad (7)$$

where $s_2 \omega_{2m}$ and $s_3 \omega_{3m}$ are the signed amplitudes of the two angular rates and $\tau$ is proportional to time. The intermediate axis spin rate is zero so $\tanh\tau = 0$ and $\text{sech}\tau = 1$, resulting in $$\omega_3 \approx s_3 \omega_{3m} = s_3 h \sqrt{\frac{I_1 - I_2}{I_2 I_3 (I_1 - I_3)}} \qquad (8)$$

Substituting Equation 8 into Equation 6 yields $$i_3 = h \left\{ \begin{array}{l} \sqrt{C_1 - C_2} - \sqrt{C_1} \quad \omega_3 > 0 \\ \sqrt{C_1} - \sqrt{C_1 - C_2} \quad \omega_3 < 0 \end{array} \right\} \quad (9)$$

where $$C_1 = \frac{I_3(I_1 - I_2)}{I_2(I_1 - I_3)} \text{ and } C_2 = \frac{I_3(1 - K)}{I_3 - KI_2} \quad (10)$$

Figure 4:
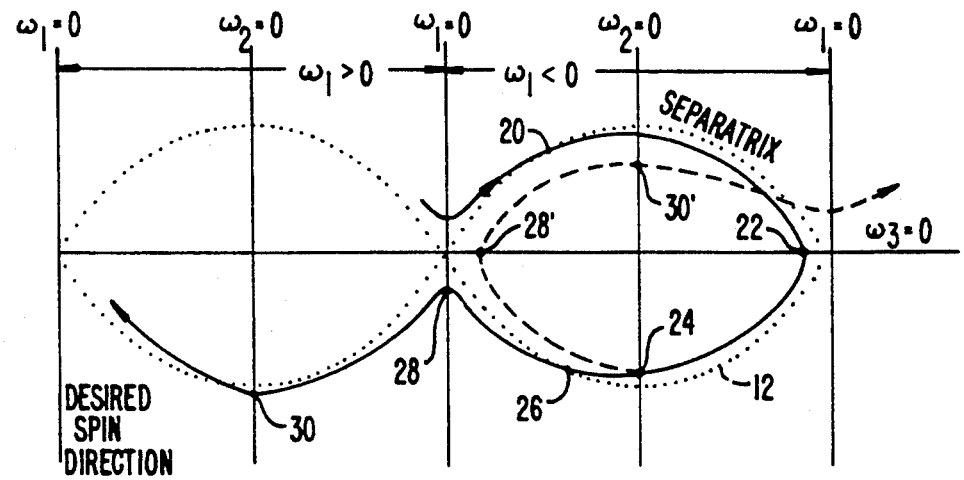
FIG. 4 is a diagram of a polhode path when spin plurality control has been implemented.

FIG. 4 illustrates spin polarity control logic affecting the polhode path. The polhode is shown folded away from the inertial ellipsoid and projected onto a plane. The separatrix 12 resembles a figure eight wherein the angular rates are zero on vertical and horizontal lines. The horizontal line through the middle corresponds to $\omega_3 = 0$ and the vertical lines correspond to $\omega_1 = 0$ and $\omega_2 = 0$, alternatively.

A typical polhode path is shown crossing the separatrix at 20. The polhode passes through $\omega_3\phi$ at 22. The sign of $\omega_1$ determines that the spin polarity is negative, the opposite of the desired direction in this particular instance. At 24, when $\omega_2 = \phi$, a thruster fires to decrease I (the thruster gain K is less than 1) and the polhode goes back across the separatrix at 26. The polhode then crosses $\omega_1 = 0$ at 28 and when $\omega_2 = 0$ at 30, a thruster fires to increase the characteristic parameter I (the gain greater than 1) by the same amount as it was decreased in the previous firing, thus ensuring capture on the desired side.

Determination of the value of the parameter K calculates a thruster impulse required to push the polhode across the separatrix. Consideration of energy dissipation rate and impulsive approximation limits a selection of this parameter.

To ensure that the first firing forces the polhode back across the separatrix, it must compensate for the energy loss since the polhode last crossed the separatrix. In the worst case, the polhode crosses the separatrix a half period from when $\omega_3 = \phi$ crosses zero, so by the time $\omega_2 = \phi$ which initiates the thruster firing, ¾ of a period has elapsed.

Designating $\Delta t$ as the time from $\omega_3 = 0$ to $\omega_2 = 0$, the worst case characteristic parameter I at the first thruster firing would be $$I = I_2 + 3\Delta t \left( \frac{\partial I}{\partial t} \right)_{separatrix} \quad (11)$$

The desired $I^+$ should be large enough to ensure the separatrix is not crossed before $\omega_1 = 0$ a quarter period later, or $$I^+ = I_2 - \Delta t \left( \frac{\partial I}{\partial t} \right)_{separatrix} \quad (12)$$

Substituting Equations 11 and 12 into Equation 4 and using Equation 3 produces $$K = \frac{1 + \Delta t \left( \frac{1}{T} \frac{\partial T}{\partial t} \right)_{separatrix}}{1 - 3\Delta t \left( \frac{1}{T} \frac{\partial T}{\partial t} \right)_{separatrix}} \quad (13)$$

In order to calculate the thruster gain value K from Equation 13, energy dissipation characteristics of the spacecraft at the separatrix must be known. Characteristics can be determined experimentally or by using telemetry data from previous spacecraft with similar energy dissipation characteristics. Any uncertainty in the energy dissipation requires use of a larger impulse to ensure capture.

Each of the two thruster firings is the same in magnitude and opposite in direction. In practice, however, the second firing can be smaller than the first firing. After the first firing, the energy dissipation of the spacecraft moves the polhode in the same direction as the desired separatrix crossing of the second firing. When the second thruster fires, the polhode is closer to the separatrix than it was for the first firing, allowing use of a smaller impulse.

Due to the limited torque capability of the thrusters, the actual firings are not impulsive. This results in a loss of efficiency, preventing achievement of the desired $I^+$. Thruster firings initiated upon sign change of $\omega_2$ require completion of the firing before $\omega_3$ changes sign. Otherwise, the firing will not produce the desired effect. If the required firing is too large for a given thruster configuration, the reduction of the initial spin rate contracts the thruster firing time proportionally (See Equation 9).

Figure 5:
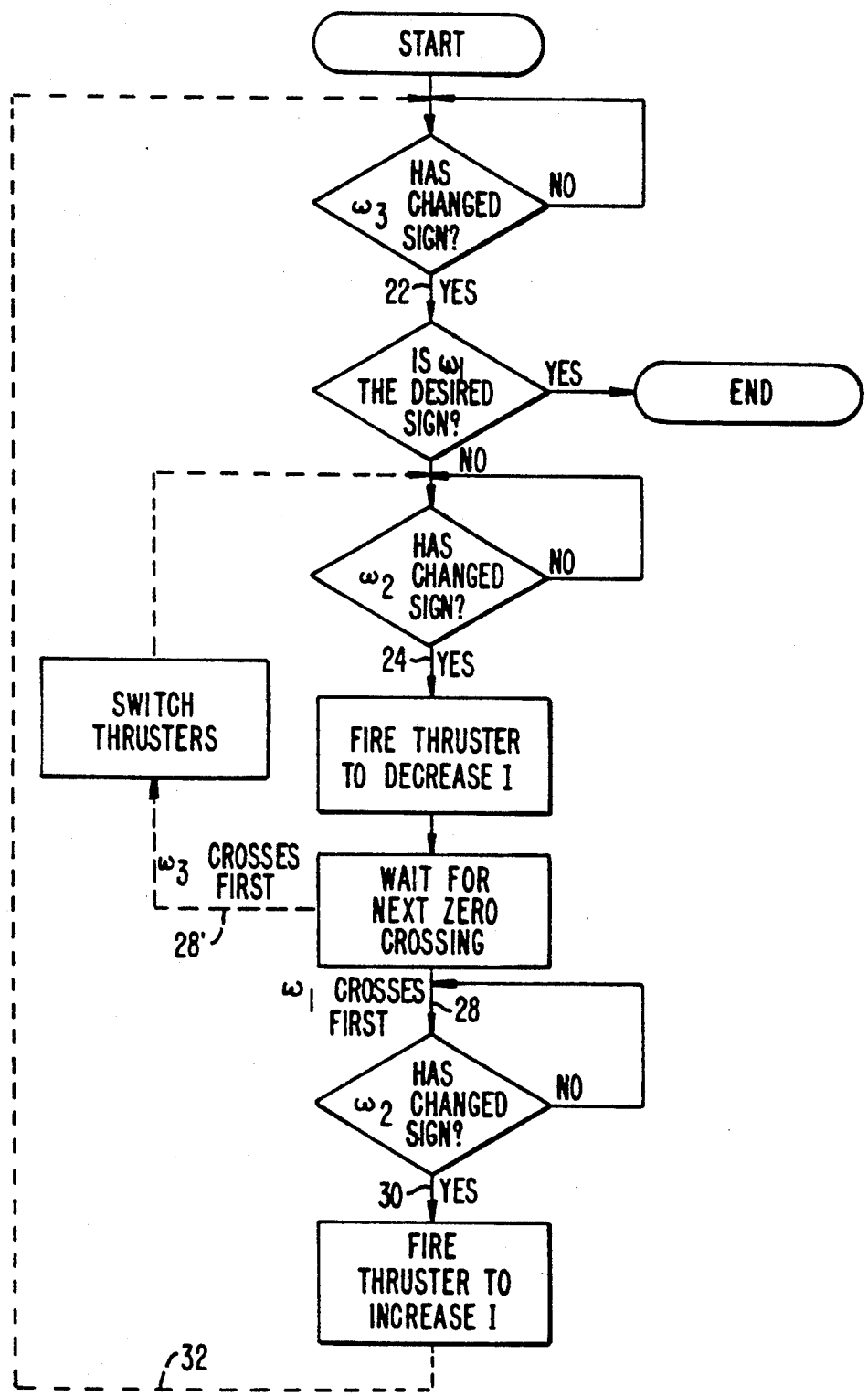
FIG. 5 is a control logic flow diagram illustrating steps for the preferred embodiment of the present invention.
Figure 6A:
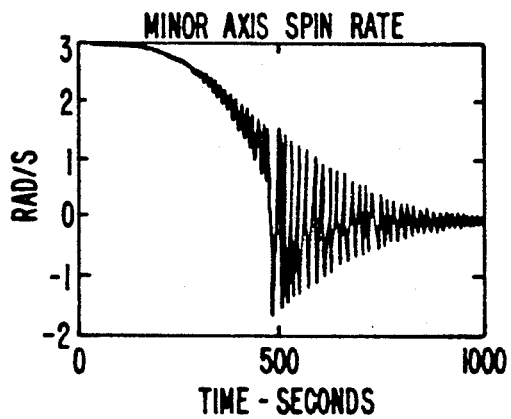
FIG. 6A-FIG. 6F are control time responses of spacecraft rates, angular momentum, kinetic energy, and characteristic parameter during spin transition; and specifically.
Figure 6B:
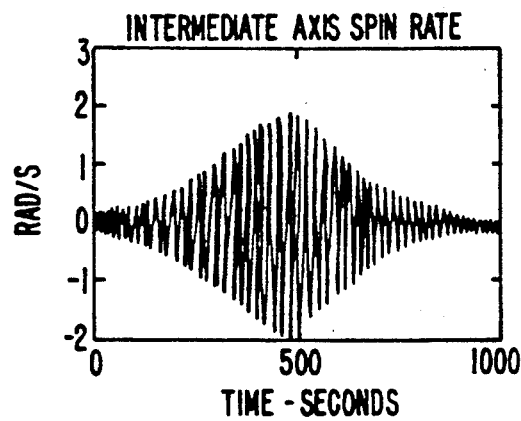
Figure 6C:
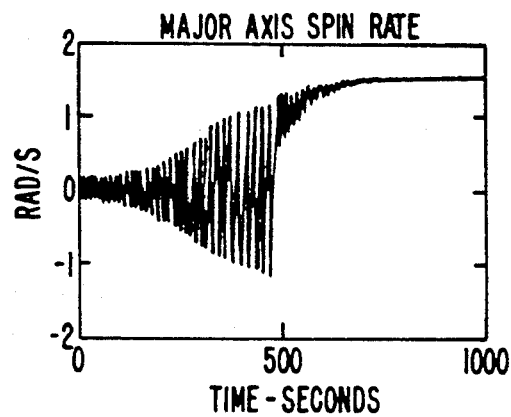
Figure 6D:
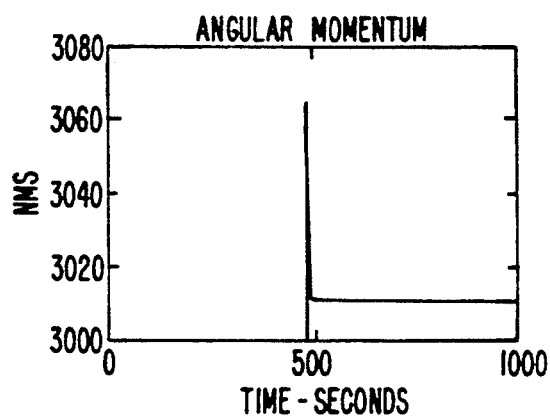
Figure 6E:
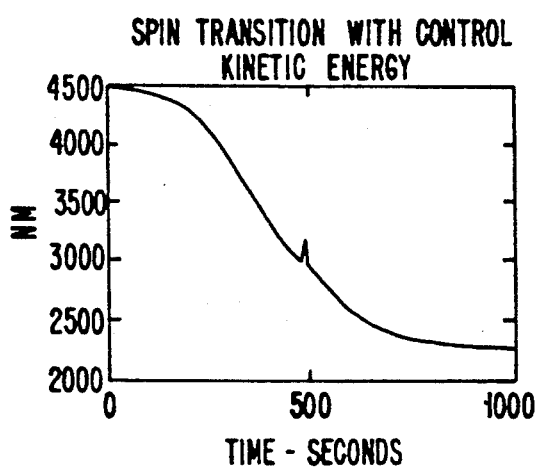
Figure 6F:
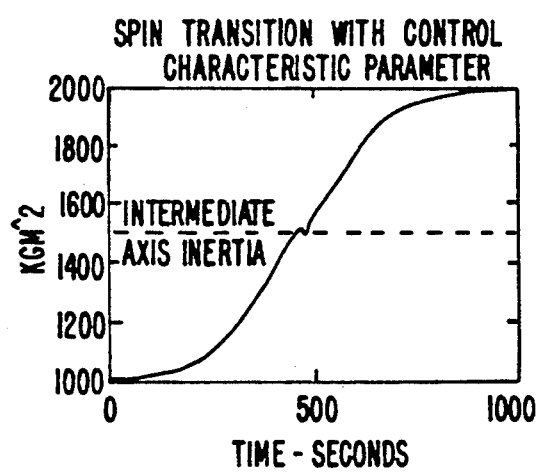

FIG. 5 is a flow diagram for the control logic used in a spin transition control according to the preferred embodiment of the present invention. Initially, a control system monitors $\omega_3$ from a gyro. An $\omega_3$ sign change, causes measurement of the sign of $\omega_1$. If $\omega_1$ has the desired sign, the spin transition was successful. If the $\omega_1$ is of opposite sign, however, the controller waits for a change in sign of $\omega_2$ and fires a first thruster which reduces the characteristic parameter I according to Equation 9. The control system then waits for a subsequent zero crossing of $\omega_1$ followed by a sign change of $\omega_2$ to initiate a torque (second thruster firing) about the minor axis to guarantee capture.

FIG. 6 illustrates a controlled time response of spacecraft spin rates, angular momentum, energy and characteristics parameter during controlled spin transition. Specifically, FIG. 6A illustrates the time response of a minor axis spin rate. FIG. 6B illustrates an intermediate axis spin rate time response, FIG. 6C illustrates a major axis spin rate time response showing a major axis spin rate resulting in a bias different from that of the illustration in FIG. 2C. FIG. 2D illustrates the angular momentum of the spacecraft time response. FIG. 6E illustrates time response of the kinetic energy of the system showing, at spin transition, the thruster firing momentarily increasing the kinetic energy. FIG. 6F illustrates the change in the characteristic parameter time response with the control showing a first decrease and then increase in the characteristic parameter. The decrease of the characteristic parameter takes the parameter below the intermediate axis inertia value and then the subsequent firing returns the characteristic parameter above the intermediate axis momentum inertia.

Figure 7:
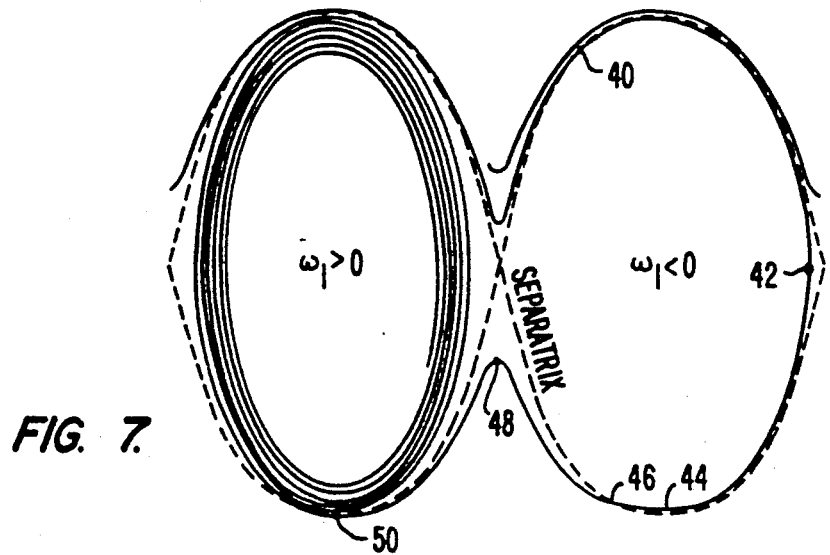
FIG. 7 is a polhode path simulation for systems employing spin polarity control according to a preferred embodiment of the present invention and implementing the control logic flow of FIG. 5.

FIG. 7 is an illustration of a polhode path simulation for systems employing spin polarity control according to the preferred embodiment of the present invention and implementing the control logic flow of FIG. 5. The polhode path of FIG. 7 illustrates control spin transition for the same initial conditions of mass properties as the system illustrated in FIG. 2. The control system of FIG. 5 ensures a positive final spin rate for the major axis ($\omega_1>0$). The polhode first crosses the separatrix at 40. When $\omega_3=0$ (at 42), $\omega_1<0$. When $\omega_2$ crosses zero (at step 44), a thruster firing causes the polhode to recross the separatrix at 46. Next, $\omega_1$ crosses zero at 48, signaling successful completion of the separatrix crossing. At 50, $\omega_2$ crosses zero, and a second firing increases the characteristic parameter I, and the polhode captures on the desired side. The time response curves of FIG. 6A through 6F and FIG. 7 shows that the $\omega_1$ response initially captures on the negative side and then is pushed by thruster firing to the positive side. The angular momentum and kinetic energy change each time the thruster fires, with the parameter I decreasing and then increasing.

A further level of sophistication is possible with the present invention. Typically, a spin transition maneuver is one of the first maneuvers conducted. It is also likely that some of the thrusters will be unused before controlling spin transitions. It is possible that there may be some thruster failure, complete or partial, which will not properly orient the spacecraft. Thus, spacecraft 10 desirably includes autonomous operation of the control logic and spin transition mechanism. Spin transition after launch vehicle separation is the first time that most of the gyros, thrusters, on-board processor, etc., are used and there usually is no ground telemetry or command during this maneuver.

The dashed polhode path in FIG. 4, illustrating steps 28' and 30', describe an alternate path followed if the first thruster firing fails. The alternate path ensures autonomous operation. If the first thruster firing fails, $\omega_3$ crosses zero 28' before $\omega_1$. Upon $\omega_3$ crossing before $\omega_1$ the control system may switch autonomously to a backup string of thrusters and fire a larger impulse at 30'.

The dotted line in FIG. 5 shows the autonomous thruster failure detection logic. After the first firing, the controller monitors both $\omega_1$ and $\omega_3$. If $\omega_1$ crosses first, then the path follows the regular logic. If $\omega_3$ crosses first, then the thrusters are reconfigured and a larger impulse is fired. The dotted path illustrated in FIG. 5 after the second firing ensures proper operation upon failure of the second thruster. In practice, limiting the number of paths through the flow diagram precludes the possibility of limit cycles.

The spin transition maneuver, when augmented with two thruster firings based on gyro measurements, provides the predetermined final spin polarity for a major axis spin that is stable for an energy dissipative system. The control logic implementing the flow diagram of FIG. 5 uses rate sign changes to determine separatrix crossings and timings for thruster firings. The control logic sizes each thruster firing based upon estimates of the energy dissipation in the spacecraft. Limitation in the torque capability of a particular thruster configuration may constrain the maximum controllable initial spin rate.

In conclusion, the present invention simply and efficiently provides a method to reorient a spinning spacecraft during a spin transition. Fuel use is minimized without requiring extra sensing equipment. The above is a complete description of the preferred embodiments of the invention. It is possible to use various alternatives, modifications, and equivalents in the practice of the present invention, some of which have been described herein. For example, other manners of directly sensing a separatrix crossing may trigger thruster firings. As discussed, the control logic may allow a single thruster firing to decrease the characteristic parameter and subsequently permit an uncontrolled spin transition back to a major axis spin bias. Each uncontrolled spin transition has a 50% chance of properly orienting itself without active control. Two thruster firings can guarantee capture in a desired configuration for a major axis bias orientation. However, the above description of the preferred embodiments does not limit the scope of the invention. The appended claims define this scope.

What is claimed is:

1. A method of effecting spin transitioning of an object having a minor axis, an intermediate axis, and a major axis from a spin about the minor axis to a particular orientation of spin about the major axis, comprising the steps of:
    a) detecting transition of the spin of the object to a spin bias about the major axis;
    b) determining that said major axis spin bias is not a desired spin bias;
    c) applying a control impulse to said object to remove said spin bias if said spin bias is not said desired spin bias; and
    d) thereafter repeating steps a) through c) until said object has said desired major axis spin bias.

2. A method of effecting spin transitioning of an object, having a minor axis, an intermediate axis, and a major axis, from a predominate minor axis spin to a particular major axis spin orientation, comprising the steps of:
    a) detecting a transition of spin of the object from the predominate minor axis spin to a major axis spin bias;
    b) determining that said major axis spin bias is not the particular major axis spin orientation;
    c) applying a first control impulse to said object to remove said major axis spin bias if said major axis spin bias is not said particular major axis spin orientation; and
    d) applying a second control impulse to said object to provide said object with said particular major axis spin orientation.

3. A method of effecting spin transitioning of an object, having a minor axis, an intermediate axis and a major axis with a spin rate measuring device for each of the spin axes of the object, and a characteristic parameter, from a predominate minor axis spin to a particular orientation of a major axis spin, comprising the steps of:
    detecting a first minor axis spin rate sign change for the minor axis spin, and thereafter
    testing a sign of a major axis spin rate to determine that the object does not have the particular major axis spin orientation; and
    if said major axis spin rate sign does not indicate the object has the particular major axis spin orientation, then thereafter:
        applying a first control impulse to decrease a characteristic parameter by a particular amount when an intermediate axis spin rate changes sign; and applying a second control impulse to increase said characteristic parameter by about said particular amount following an intermediate axis spin rate sign change sign after a minor axis spin rate sign change.

4. A method of effecting spin transitioning of an object having a minor axis, an intermediate axis, and a major from a spin about the minor axis to a particular orientation of spin about the major axis, comprising the steps of:
 a) detecting a spin bias about the major axis after a spin transition of the object;
 b) determining that said major axis spin bias is not a desired spin bias;
 c) removing said major axis spin bias if said major axis spin bias is not said desired spin bias; and
 d) thereafter repeating steps a) through c) until said object has said desired major axis spin bias.

5. The method of claim 4 wherein said removing step further comprises the step of:
 firing a first thruster to decrease a characteristic parameter of the object by a first particular amount.

6. A method for effecting a desired spin transition, comprising the steps of:
 providing a spinning object characterized by a minor axis, an intermediate axis, and a major axis, said object having a predominate minor axis spin;
 establishing a first separatrix crossing for a polhode associated with said spinning object, said polhode identified by an intersection of a momentum ellipsoid and an energy ellipsoid for said spinning object; thereafter
 determining that said spinning object does not have a desired major axis spin bias; and thereafter
 if said major axis spin bias does not have said desired major axis spin bias:
  decreasing a characteristic parameter of said spinning object to produce a second separatrix crossing; and
  repeating said establishing, determining and decreasing steps until said spinning object has said desired major axis spin bias.

7. A method for effecting a desired spin transition, comprising the steps of:
 providing a spinning object characterized by a minor axis, an intermediate axis, and a major axis, said object having a predominate minor axis spin;
 establishing a first separatrix crossing for a polhode associated with said spinning object, said polhode identified by an intersection of a momentum ellipsoid and an energy ellipsoid for said spinning object; thereafter
 determining that said spinning object does not have a desired major axis spin bias; and thereafter
 if said major axis spin bias does not have said desired major axis spin bias:
  decreasing a characteristic parameter of said spinning object to produce a second separatrix crossing; and thereafter
 increasing said characteristic parameter of said spinning object to produce a third separatrix crossing which provides said spinning object with said desired major axis spin bias.

8. The method of claim 7 wherein said establishing an determining steps each comprise the step of:
 monitoring a gyroscope rate output for an indication of a rate sign change.

9. The method of claim 7 wherein said establishing and determining steps each comprise the step of:
 monitoring a gyroscope rate output for an indication of a rate passing through a predetermined value within a non-saturation range of said gyroscope.

10. The method of claim 7 wherein said decreasing and increasing steps each comprise the step of:
 firing a thruster to effect rotation about a prespecified axis.

11. The method of claim 7 wherein said establishing step comprises monitoring a minor axis spin rate to detect a prespecified change in said minor axis spin rate.

12. The method of claim 7 wherein said determining step comprises monitoring a major axis spin rate to detect a prespecified bias for said major axis spin rate.

13. A method for effecting a desired spin transition, comprising the steps of:
 providing a spinning object characterized by a minor axis, an intermediate axis, and a major axis, said object having a predominate minor axis spin;
 establishing a first separatrix crossing for a polhode associated with said spinning object, said polhode identified by an intersection of a momentum ellipsoid and an energy ellipsoid for said spinning object; thereafter
 determining that said spinning object does not have a desired major axis spin bias; and thereafter
 initiating a decrease in a characteristic parameter of said spinning object to produce a second separatrix crossing; and thereafter
 initiating an increase in said characteristic parameter of said spinning object to produce a third separatrix crossing which provides said spinning object with said desired major axis spin bias.

14. The method of claim 13 wherein said characteristic parameter decrease initiating step is responsive to a predetermined rate change of a spin rate of said intermediate axis.

15. The method of claim 13 wherein said characteristic parameter increase initiating step is responsive to a predetermined rate change of a spin rate of said intermediate axis after a predetermined rate change of a spin rate of said major axis.

16. The method of claim 13 further comprising the steps of:
 detecting a failure of said characteristic parameter decrease initiating step to produce a second separatrix crossing; and
 reinitiating a decrease in said characteristic parameter to produce said second separatrix crossing within a predetermined interval of time if said failure is detected.

17. The method of claim 13 further comprising the steps of:
 detecting a failure of said characteristic parameter increase initiating step to produce a third separatrix crossing; and
 reinitiating an increase in said characteristic parameter to produce said third separatrix crossing within a predetermined interval of time if said failure is detected.

18. The method of claim 13 further comprising the steps of:
 detecting a first failure of said characteristic parameter decrease initiating step to produce a second separatrix crossing;
 reinitiating a decrease in said characteristic parameter to produce said second separatrix crossing within a predetermined interval of time if said first failure is detected;

detecting a second failure of said characteristic parameter increase initiating step to produce a third separatrix crossing; and reinitiating an increase in said characteristic parameter to produce said third separatrix crossing within a predetermined interval of time if said second failure is detected.

19. A method of effecting spin transitioning of an object having a minor axis, an intermediate axis, and a major axis from a spin about the minor axis to a particular orientation of spin about the major axis, comprising the steps of:
   a) monitoring, without exerting active major spin axis orientation control, said object for a transition of the spin of the object to a spin bias about the major axis; and thereafter
   b) determining that said major axis spin bias does not have a desired spin bias;
   c) applying a first control impulse to said object to remove said spin bias only if said spin bias is not said desired spin bias; and thereafter
   d) applying a second control impulse to said object to orient said major spin axis bias equal to said desired spin bias.

* * * * *